United States Patent
McNew

(10) Patent No.: US 11,332,007 B2
(45) Date of Patent: May 17, 2022

(54) VEHICLE SPEED CONTROL USING SPEED MAPS

(71) Applicant: TOYOTA MOTOR ENGINEERING & MANUFACTURING NORTH AMERICA, INC., Plano, TX (US)

(72) Inventor: John-Michael McNew, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 196 days.

(21) Appl. No.: 16/239,014

(22) Filed: Jan. 3, 2019

(65) Prior Publication Data
US 2020/0215914 A1   Jul. 9, 2020

(51) Int. Cl.
  *B60K 31/00*   (2006.01)
  *B60W 20/00*   (2016.01)
  *B60W 50/00*   (2006.01)
  *B60K 6/40*    (2007.10)

(52) U.S. Cl.
  CPC ............ *B60K 31/00* (2013.01); *B60W 20/00* (2013.01); *B60W 50/00* (2013.01); *B60K 6/40* (2013.01); *B60W 2050/0026* (2013.01); *B60W 2520/10* (2013.01); *B60W 2540/30* (2013.01); *B60W 2552/00* (2020.02); *B60W 2555/60* (2020.02); *B60Y 2200/92* (2013.01)

(58) Field of Classification Search
  USPC ....................................................... 701/93
  See application file for complete search history.

(56) References Cited

U.S. PATENT DOCUMENTS

| | | | |
|---|---|---|---|
| 6,246,948 B1 | 6/2001 | Thakker | |
| 6,675,085 B2 | 1/2004 | Straub | |
| 7,602,782 B2* | 10/2009 | Doviak | H04L 12/5692 370/389 |
| 9,292,895 B2* | 3/2016 | Rodriguez | H05B 47/11 |
| 9,932,035 B1 | 4/2018 | Ferguson | |
| 10,026,309 B1* | 7/2018 | Nepomuceno | G08G 1/164 |
| 10,698,114 B2* | 6/2020 | Keilaf | G01S 7/4815 |
| 2009/0088963 A1* | 4/2009 | Horiguchi | G08G 1/096844 701/532 |
| 2015/0309512 A1* | 10/2015 | Cudak | G08G 1/096741 701/23 |
| 2016/0176401 A1 | 6/2016 | Pilkington | |
| 2017/0176198 A1* | 6/2017 | Tatourian | G06K 9/00845 |

(Continued)

OTHER PUBLICATIONS

NPL, Hern, Alex, The Guardian, Tesla Allows Self Driving Cars to Break Speed Limit Again, (Jan. 6, 2017)( https://www.theguardian.com/technology/2017/jan/16/tesla-allows-self-driving-cars-to-break-speed-limit-again).*

(Continued)

*Primary Examiner* — Jean Paul Cass
(74) *Attorney, Agent, or Firm* — Sheppard, Mullin, Richter & Hampton LLP; Hector A. Agdeppa; Daniel N. Yannuzzi

(57) ABSTRACT

Disclosed is a method for controlling the speed of a vehicle, the method comprising: determining a speed limit; determining an offset value based on (i) the speed limit, and (ii) a speed map, the speed map comprising a plurality of entries, each entry associating one of the offset values with a respective speed limit; and setting the speed of the vehicle according to the speed limit and the determined offset value.

20 Claims, 9 Drawing Sheets

(56) References Cited

U.S. PATENT DOCUMENTS

| | | | | |
|---|---|---|---|---|
| 2018/0174446 A1* | 6/2018 | Wang | ..................... | G08G 1/017 |
| 2019/0051179 A1* | 2/2019 | Alvarez | ................ | H04W 12/63 |
| 2019/0102840 A1* | 4/2019 | Perl | ....................... | B60W 40/09 |
| 2019/0155292 A1* | 5/2019 | Gutmann | ............... | B60W 30/16 |
| 2019/0364492 A1* | 11/2019 | Azizi | ................... | H04W 48/16 |
| 2020/0074266 A1* | 3/2020 | Peake | .................. | G01S 17/931 |
| 2020/0148204 A1* | 5/2020 | Kunz | .................. | G05D 1/0088 |
| 2020/0264900 A1* | 8/2020 | Cheriton | ............... | G16H 50/20 |

OTHER PUBLICATIONS

Svegliato, An Integrated Approach to Moral Autonomous Systems (2020).*
Svegliato, Ethically Compliant Planning in Moral Autonomous Systems (2020).*
Svegliato, Ethically Compliant Sequential Decision Making (2021).*
Winfield, An architecture for ethical robots inspired by the simulation theory of cognition (2018).*
BBC News, Google driverless cars designed to exceed speed limit, (2014).*
Marcus, Tesla Forum: Speed Limits and Autopilot, Oct. 27, 2015, 7 pages, retrieved from: https://forums.tesla.com/forum/forums/speed-limits-and-autopilot.

\* cited by examiner

400

| SPEED LIMIT | OFFSET |
|---|---|
| 5 mph | 5 mph |
| 10 mph | 5 mph |

⋮

| 30 mph | 10 mph |
|---|---|

⋮

| 70 mph | 5 mph |
|---|---|

| SPEED LIMIT | DESIRED SPEED |
|---|---|
| 5 mph | 10 mph |
| 10 mph | 15 mph |

⋮

| 30 mph | 40 mph |
|---|---|

⋮

| 70 mph | 75 mph |
|---|---|

| SPEED LIMIT | NORMAL OFFSET | ADVERSE-CONDITIONS OFFSET |
|---|---|---|
| 5 mph | 5 mph | 0 mph |
| 10 mph | 5 mph | 0 mph |
| ⋮ | ⋮ | ⋮ |
| 30 mph | 10 mph | -5 mph |
| ⋮ | ⋮ | ⋮ |
| 70 mph | 5 mph | -10 mph |

FIG. 8

VEHICLE SPEED CONTROL USING SPEED MAPS

TECHNICAL FIELD

The present disclosure relates generally to vehicles. In particular, embodiments of the present disclosure relate to controlling the speed of a vehicle.

DESCRIPTION OF RELATED ART

Modern vehicles include many convenience features to control or assist controlling the vehicle. One such feature is often referred to as "cruise control." With this feature, the driver may select a particular speed to be maintained by the vehicle. The vehicle then maintains that speed until the driver changes the speed, or disables cruise control, for example by turning the feature off or pressing the brake pedal.

BRIEF SUMMARY OF THE DISCLOSURE

In general, one aspect disclosed features a method for controlling the speed of a vehicle, the method comprising: determining a speed limit; determining an offset value based on (i) the speed limit, and (ii) a speed map, the speed map comprising a plurality of entries, each entry associating one of the offset values with a respective speed limit; and setting the speed of the vehicle according to the speed limit and the determined offset value.

Embodiments of the method may include one or more of the following features. Some embodiments comprise modifying the speed map according to behavior of a driver of the vehicle. In some embodiments, modifying the speed map occurs without human intervention. In some embodiments, modifying the speed map occurs responsive to human intervention. In some embodiments, modifying the speed map comprises: measuring a speed of the vehicle; and recording the speed limit and an offset value in the speed map, the offset value representing a difference between the speed of the vehicle and the speed limit. Some embodiments comprise determining an adverse condition for the road being traveled by the vehicle; and adjusting the speed of the vehicle based on the adverse condition. In some embodiments, determining an offset value comprises: when the speed map does not contain an entry for the determined speed limit, interpolating using a plurality of the entries in the speed map.

In general, one aspect disclosed features a method for controlling the speed of a vehicle, the method comprising: determining a speed limit; determining a desired speed based on (i) the speed limit, and (ii) a speed map, the speed map comprising a plurality of entries, each entry associating one of the desired speeds with a respective speed limit; and setting the speed of the vehicle according to the speed limit and the desired speed.

Embodiments of the method may include one or more of the following features. Some embodiments comprise modifying the speed map according to behavior of a driver of the vehicle. In some embodiments, modifying the speed map occurs without human intervention. In some embodiments, modifying the speed map occurs responsive to human intervention. In some embodiments, modifying the speed map comprises: measuring a speed of the vehicle; and recording the speed of the vehicle and the speed limit in the speed map. Some embodiments comprise determining an adverse condition for the road being traveled by the vehicle; and adjusting the speed of the vehicle based on the adverse condition. In some embodiments, determining a desired speed comprises: when the speed map does not contain an entry for the determined speed limit, interpolating using a plurality of the entries in the speed map.

In general, one aspect disclosed features non-transitory machine-readable storage medium encoded with instructions executable by a hardware processor of a computing component of a vehicle, the machine-readable storage medium comprising instructions to cause the hardware processor to: determine a speed limit; determine an offset value based on (i) the speed limit, and (ii) a speed map, the speed map comprising a plurality of entries, each entry associating one of the offset values with a respective speed limit; and set the speed of the vehicle according to the speed limit and the determined offset value.

Embodiments of the non-transitory machine-readable storage medium may include one or more of the following features. Some embodiments comprise instructions to cause the hardware processor to: modify the speed map according to behavior of a driver of the vehicle. Some embodiments comprise instructions to cause the hardware processor to: modify the speed map without human intervention. Some embodiments comprise instructions to cause the hardware processor to: modify the speed map responsive to human intervention. Some embodiments comprise instructions to cause the hardware processor to: measure a speed of the vehicle; and record the speed limit and an offset value in the speed map, the offset value representing a difference between the speed of the vehicle and the speed limit. Some embodiments comprise instructions to cause the hardware processor to: determine an adverse condition for the road being traveled by the vehicle; and adjust the speed of the vehicle based on the adverse condition.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 shows an example speed map storing offset speeds according to one embodiment.

FIG. 6 shows an example speed map storing desired speeds according to one embodiment.

FIG. 8 shows a speed map using adverse conditions offsets.

The figures are not exhaustive and do not limit the present disclosure to the precise form disclosed.

DETAILED DESCRIPTION

Various embodiments are directed to allowing a driver to set vehicle speed relative to the legal speed limit. Embodiments of the technology disclosed herein allow a driver to program a vehicle to travel at a speed set relative to the speed limit. The disclosed technology may be applied to autonomous and semi-autonomous vehicles, as well as to vehicles operated by manual driving with cruise control.

In some embodiments, the driver may set a universal offset to be applied to all speed limits. In other embodiments, the driver may set a different offset for different speed limits. That is, the driver may populate a speed map that contains different offsets to be applied to different determined speed limits. For instance, the driver might enter an offset of 10 mph for a speed limit of 30 mph and an offset of 5 mph for 70 mph. To set the vehicle speed, the system applies these offsets and may be configured to interpolate at speeds in between those for which an offset is defined.

In some embodiments, the system may learn a speed map from the driver's behaviors. For example, if the driver drives 78 when the speed limit is 70 but exactly 25 when the speed limit is 25, the system may learn this and modify the speed map accordingly. Such learning may further take into account features beyond speed limits, such as road type, traffic density, time of day, etc.

Figure 1:
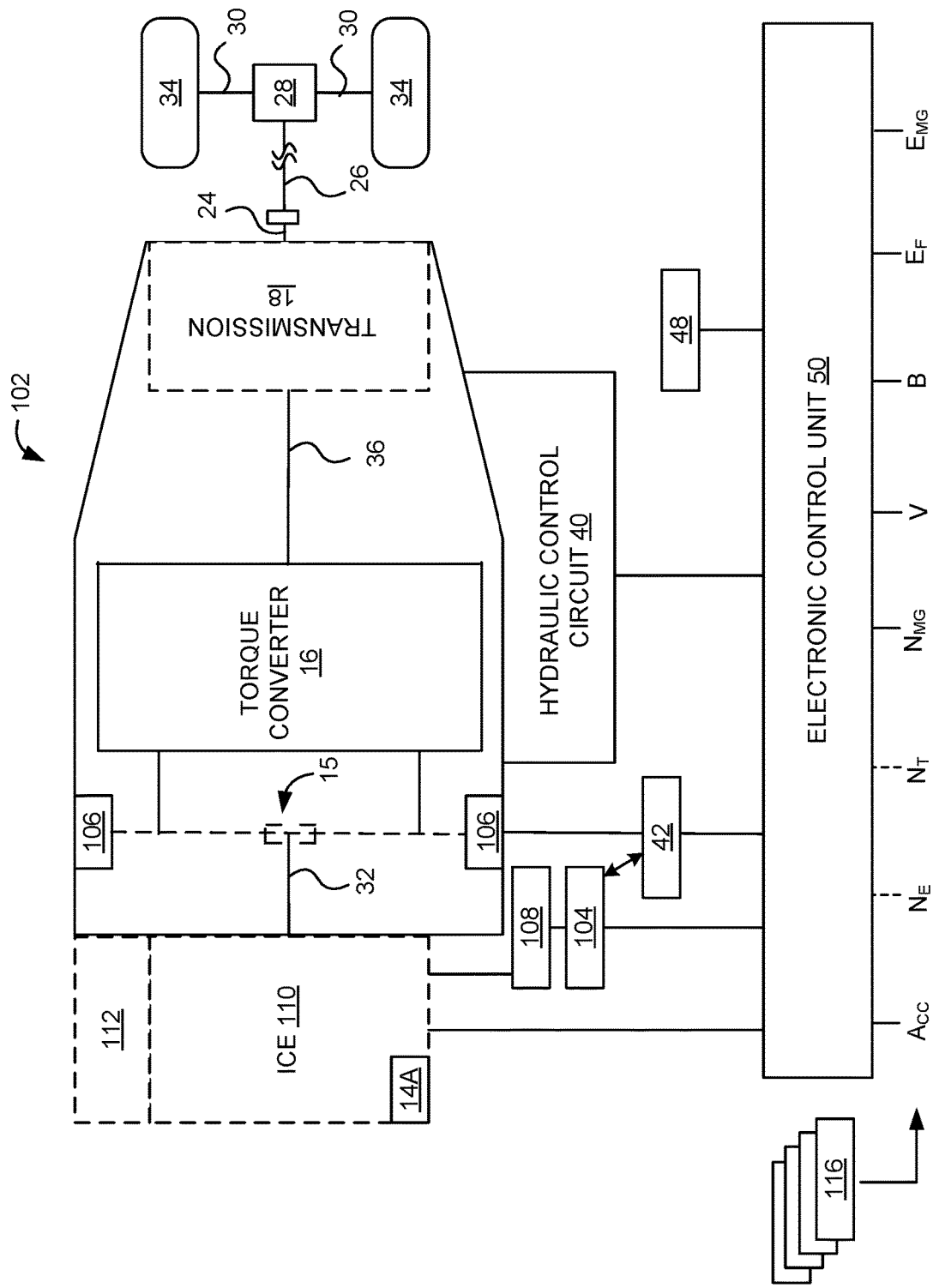
FIG. 1 illustrates an example vehicle in which embodiments of the disclosed technology may be implemented.

An example vehicle 102 in which embodiments of the disclosed technology may be implemented is illustrated in FIG. 1. The vehicle depicted in FIG. 1 is a hybrid electric vehicle. However, the disclosed technology is independent of the means of propulsion of the vehicle, and so applies equally to vehicles without an electric motor, and to vehicles without an internal combustion engine.

FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 110 (engine RPM), a rotational speed, $N_{MG}$, of the motor 106 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to engine control unit 50 (which, again, may be implemented as one or a plurality of individual control circuits). In one embodiment, sensors 116 may be included to detect one or more conditions directly or indirectly such as, for example, fuel efficiency, $E_F$, motor efficiency, $E_{MG}$, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
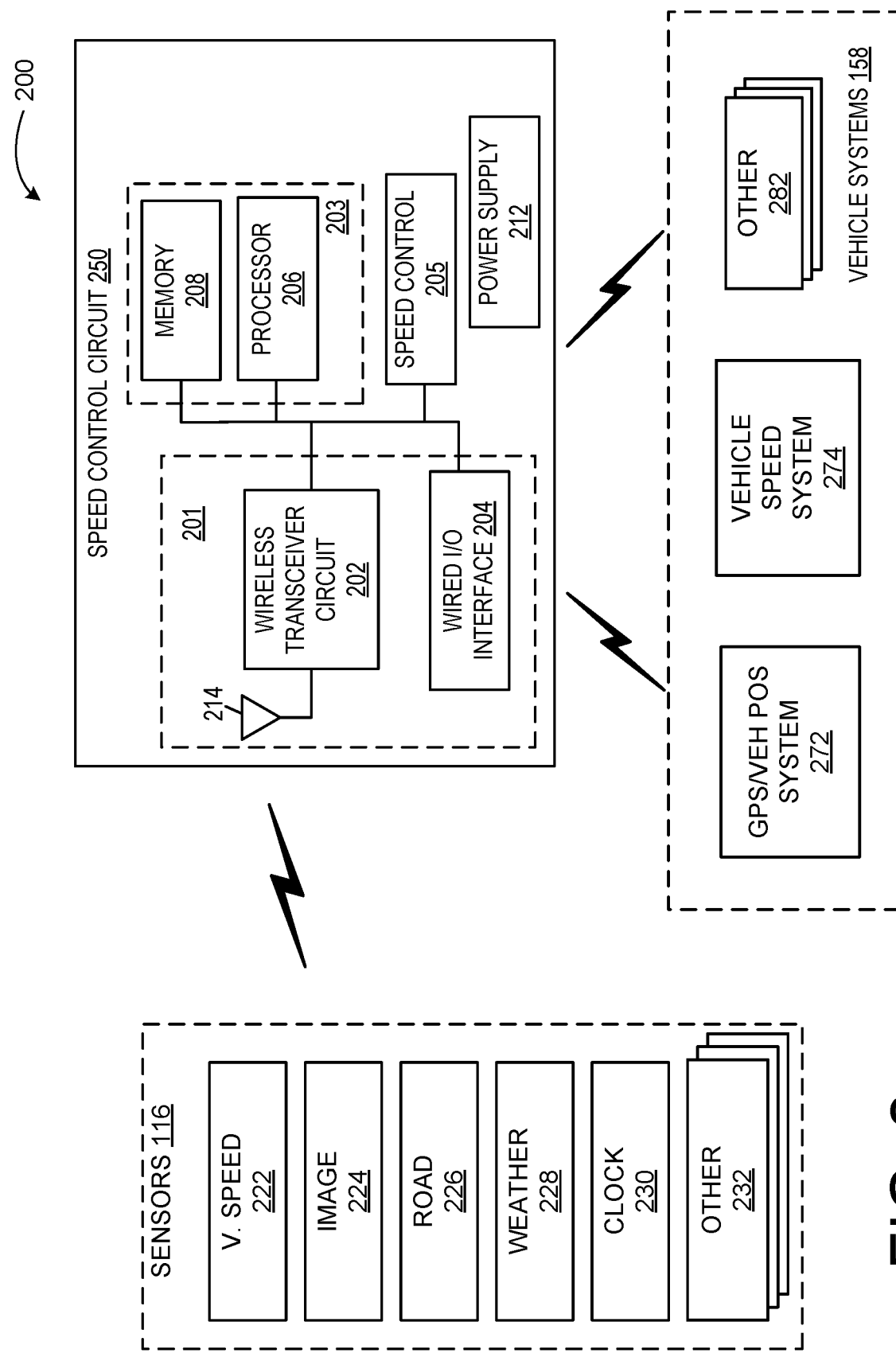
FIG. 2 illustrates an example architecture for controlling the speed of a vehicle in accordance with one embodiment of the systems and methods described herein.

FIG. 2 illustrates an example architecture for controlling the speed of a vehicle in accordance with one embodiment of the systems and methods described herein. Referring now to FIG. 2, in this example, a vehicle speed control system 200 includes a speed control circuit 250, a plurality of sensors 116, and a plurality of vehicle systems 158. Sensors 116 and vehicle systems 158 can communicate with speed control circuit 250 via a wired or wireless communication interface. Although sensors 116 and vehicle systems 158 are depicted as communicating with speed control circuit 250, they can also communicate with each other as well as with other vehicle systems. Speed control circuit 250 can be implemented as an ECU or as part of an ECU such as, for example electronic control unit 50. In other embodiments, speed control circuit 250 can be implemented independently of the ECU. In further embodiments, speed control circuit 250 can be implemented as part of vehicle speed system 274.

Speed control circuit 250 in this example includes a communication circuit 201, a processing circuit 203 (including a processor 206 and memory 208 in this example) and a power supply 212. Components of speed control circuit 250 are illustrated as communicating with each other via a data bus, although other communication interfaces can be included. Speed control circuit 250 in this example also includes a speed control 205 that can be operated by the user to control the speed control circuit 250, for example by manual controls, touch screen, voice, and the like.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to speed control circuit 250.

Although the example of FIG. 2 is illustrated using processor and memory circuitry, as described below with reference to circuits disclosed herein, speed control circuit 250 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a speed control circuit 250.

Communication circuit 201 may include either or both a wireless transceiver circuit 202 with an associated antenna 214 and a wired I/O interface 204 with an associated hardwired data port (not illustrated). As this example illustrates, communications with speed control circuit 250 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by speed control circuit 250 to/from other entities such as sensors 116 and vehicle systems 158.

Wired I/O interface 204 can include a transmitter and a receiver (not shown) for hardwired communications with other devices. For example, wired I/O interface 204 can provide a hardwired interface to other components, including sensors 116 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., lithium-ion, lithium-polymer, nickel metal hydride (NiMH), nickel-cadmium (NiCd), nickel-zinc (NiZn), nickel-hydrogen (NiH$_2$), rechargeable, primary battery, etc.), a power connector (e.g., to connect to vehicle-supplied power, etc.), an energy harvester (e.g., solar cells, piezoelectric system, etc.), or include any other suitable power supply.

Sensors 116 may include additional sensors that may or not otherwise be included on a standard vehicle 102 with which the speed control system 200 is implemented. In the illustrated example, sensors 116 include vehicle speed sensor 222, image sensor 224, road sensor 226, weather sensor 228, and clock 230. Additional sensors 232 can also be included as may be appropriate for a given implementation of speed control system 200. Image sensor 224 can be implemented as a CCD, LCD or other image sensor to detect road signs, road conditions, obstacles in the road, etc. Sensor information can be processed (e.g., via processing circuit 203) to determine a current speed limit (e.g., via road signs), a type and severity of adverse road conditions, and so on. Road sensors 226 can include, for example, radar and lidar sensors to detect road contours and terrain, wheel-mounted accelerometers to detect wheel deflection amounts, chassis-mounted accelerometers to detect vibration amounts, and so on. Weather sensors 228 can include temperature, pressure and humidity sensors such as, for example, to detect freezing conditions.

Vehicle systems 158 can include any of a number of different vehicle components or subsystems used to control or monitor various aspects of the vehicle and its performance. In this example, the vehicle systems 158 include a vehicle position system 272, a vehicle speed system 274, and other vehicle systems 282. Vehicle position system 272 may determine a geographic position of the vehicle, as well as its direction and speed. Vehicle position system 272 may include a global positioning satellite (GPS) system or the like. The vehicle speed system 274 may include systems such as acceleration systems, braking systems, and the like.

During operation, speed control circuit 250 can receive information from various vehicle sensors 116 to determine whether the speed control mode should be activated. Also, the driver may manually activate the speed control mode by operating speed control 205. Communication circuit 201 can be used to transmit and receive information between speed control circuit 250 and sensors 116, and speed control circuit 250 and vehicle systems 158. Also, sensors 116 may communicate with vehicle systems 158 directly or indirectly (e.g., via communication circuit 201 or otherwise).

In various embodiments, communication circuit 201 can be configured to receive data and other information from sensors 116 that is used in determining whether to activate the speed control mode. Additionally, communication circuit 201 can be used to send an activation signal or other activation information to various vehicle systems 158 as part of entering the speed control mode. For example, as described in more detail below, communication circuit 201 can be used to send signals to, for example, the vehicle speed system 274. Examples of this are described in more detail below.

Figure 3:
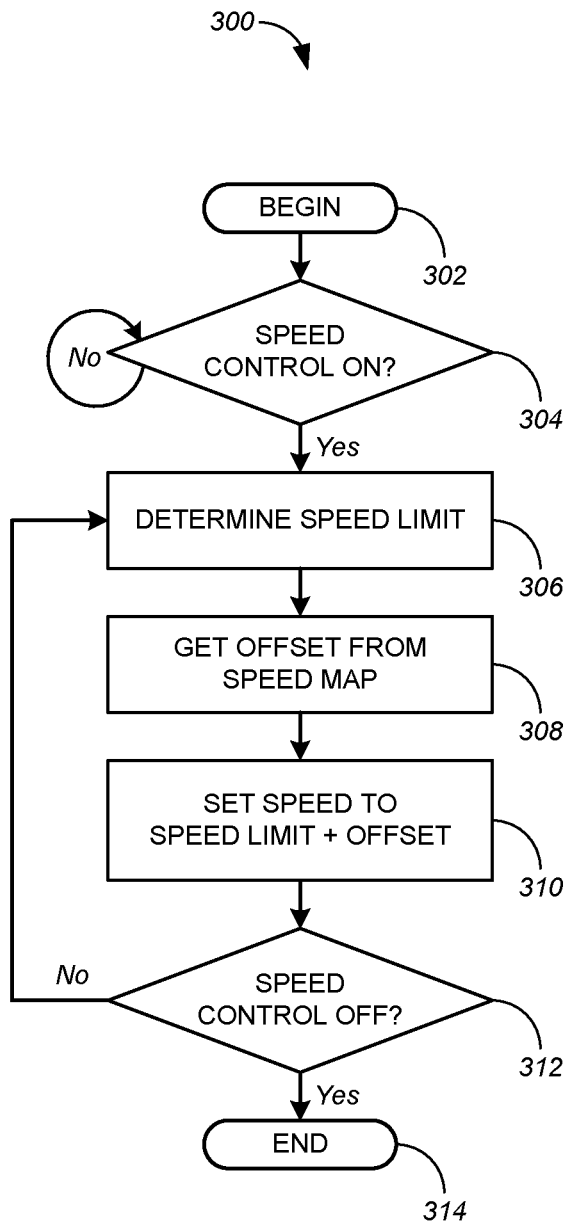
FIG. 3 is a flowchart illustrating a process for controlling the speed of a vehicle using offset speeds according to one embodiment.

FIG. 3 is a flowchart illustrating a process 300 for controlling the speed of a vehicle using offset speeds according to one embodiment. Referring to FIG. 3, the process 300 begins, at 302. The speed control circuit 250 first determines whether the speed control mode is on, at 304. This may include determining whether the speed control mode has been activated, for example manually by the driver using the speed control 205. The speed control circuit 250 continues this determination until the speed control mode is activated.

When the speed control mode is activated, the speed control circuit 250 determines a speed limit for the section of road being traveled by the vehicle, at 306. In some embodiments, the speed control circuit 250 determines the speed limit using images of road signs captured by the image sensor 224. In other embodiments, the speed control circuit 250 determines the speed limit using databases that correlate the position of the vehicle with the speed limit. In yet further embodiments, the speed limit may be included in information received from vehicle positioning system 272. After determining the speed limit, the speed control circuit 250 determines an offset from the determined speed limit. For example, in some embodiments the offset can be determined from a speed map containing offset information relative to the determined speed limit, at 308.

FIG. 4 shows an example speed map 400 storing offset speeds according to one embodiment. Referring to FIG. 4, the speed map 400 includes a plurality of entries. Each entry associates an offset value with a respective speed limit. In the speed map 400 and FIG. 4, an offset of 5 mph is associated with speed limits of 5 mph, 10 mph, and 70 mph, while an offset of 10 mph is associated with the speed limit of 30 mph. In some embodiments, the speed map 400 is populated manually by the user. For example, the user may employ an application (e.g., a smart phone app) or the vehicle touch panel to populate the speed map 400 by entering his or her desired offset amounts for one or more of the plurality of speed limits. As another example, the driver may employ the speed control 205 to enter or modify entries in speed map 400. For example, while driving at 40 mph in a 30 mph zone, the user may press a speed control button that records both the speed limit of 30 mph and the associated offset of 10 mph in the speed map 400. In an example described below, speed map 400 may be populated by machine learning through observation of the speeds driven in different speed limit zones. In some embodiments, multiple speed maps are maintained, one for each driver of the vehicle for example, as described above.

The speed control circuit 250 determines an offset value based on (i) the speed limit, and (ii) the speed map 400. The speed control circuit 250 then sets the speed of the vehicle according to the speed limit and the determined offset value, at 310. In particular, the speed control circuit 250 determines a desired vehicle speed by adding the offset value to the determined speed limit. For example, referring to FIG. 4, for a speed limit of 30 mph, the offset is 10 mph, yielding a desired speed of 40 mph. Therefore, the speed control circuit 250 sets the speed of the vehicle to 40 mph. When the speed map 400 does not contain an entry for the determined speed limit, speed control circuit 250 may interpolate using a plurality of the entries in the speed map 400. In other embodiments, when the speed map 400 does not contain an entry for the determined speed limit, the vehicle set speed can be the same as the determined speed limit.

The speed control circuit 250 may be implemented to occasionally determine whether the speed control mode has been deactivated, at 312. While the speed control mode is active, the speed control circuit 250 continues to determine the speed limit, get offsets from the speed map, and set the vehicle speed according to the speed limits and offsets. When the speed control mode is deactivated, the process 300 ends, at 314. In some embodiments, the driver may manually deactivate the speed control mode. In other embodiments, the vehicle may automatically deactivate the speed control mode such as, for example, for safety reasons.

Figure 5:
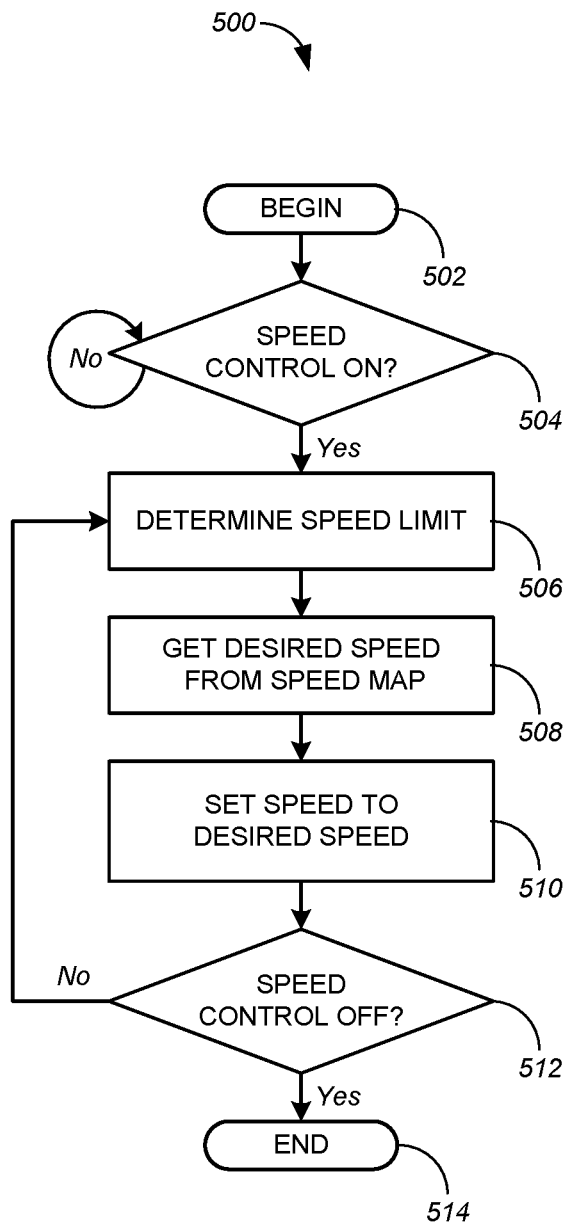
FIG. 5 is a flowchart illustrating a process for controlling the speed of a vehicle using desired speeds according to one embodiment.

In some embodiments, the speed map stores desired speeds rather than offsets. FIG. 5 is a flowchart illustrating a process 500 for controlling the speed of a vehicle using desired speeds according to one embodiment. Referring to FIG. 5, the process 500 begins, at 502. The speed control circuit 250 first determines whether the speed control mode is on, at 504. This may include determining whether the speed control mode has been activated, for example manually by the driver using the speed control 205. The speed control circuit 250 continues this determination until the speed control mode is activated.

When the speed control mode is entered, the speed control circuit 250 determines a speed limit, at 506, for example as described above. After determining the speed limit, the speed control circuit 250 gets a desired speed from a speed map based on the determined speed limit, at 508.

FIG. 6 shows an example speed map 600 storing desired speeds according to one embodiment. Referring to FIG. 6, the speed map 600 includes a plurality of entries. Each entry associates a desired speed with a respective speed limit. In the speed map 600 and FIG. 6, desired speeds of 10 mph, 15 mph, 40 mph, and 75 mph are associated with speed limits of 5 mph, 10 mph, 30 mph, and 70 mph, respectively. In some embodiments, the speed map 600 is populated manually by the user. For example, the user may employ an application (e.g., a smart phone app) or the vehicle touch panel to populate the speed map 600 by entering his or her travel speeds for one or more of the plurality of speed limits. As another example, the driver may employ the speed control 205 to enter or modify entries in speed map 600. For example, while driving at 60 mph in a 50 mph zone, the user may press a speed control button that records both the speed limit of 50 mph and the associated desired speed of 60 mph in the speed map 600. As noted above, speed map 600 may be populated by machine learning through observation of the speeds driven in different speed limit zones. In some embodiments, multiple speed maps are maintained, one for each driver of the vehicle, for example as described above.

Referring again to FIG. 5, the speed control circuit 250 determines a desired speed based on (i) the speed limit, and (ii) the speed map 600. The speed control circuit 250 then sets the speed of the vehicle according to the determined desired speed, at 510. For example, referring to FIG. 6, for a speed limit of 30 mph, the desired speed is 40 mph. Therefore the speed control circuit 250 sets the speed of the vehicle to 40 mph. When the speed map 600 does not contain an entry for the determined speed limit, speed control circuit 250 may interpolate using a plurality of the entries in the speed map 600.

The speed control circuit 250 occasionally determines whether the speed control mode has been deactivated, at 512. While the speed control mode is active, the speed control circuit 250 continues to determine speed limits, get desired speeds from the speed map, and set the vehicle speed to the desired speed. When the speed control mode is deactivated, the process 500 ends, at 514.

Figure 7:
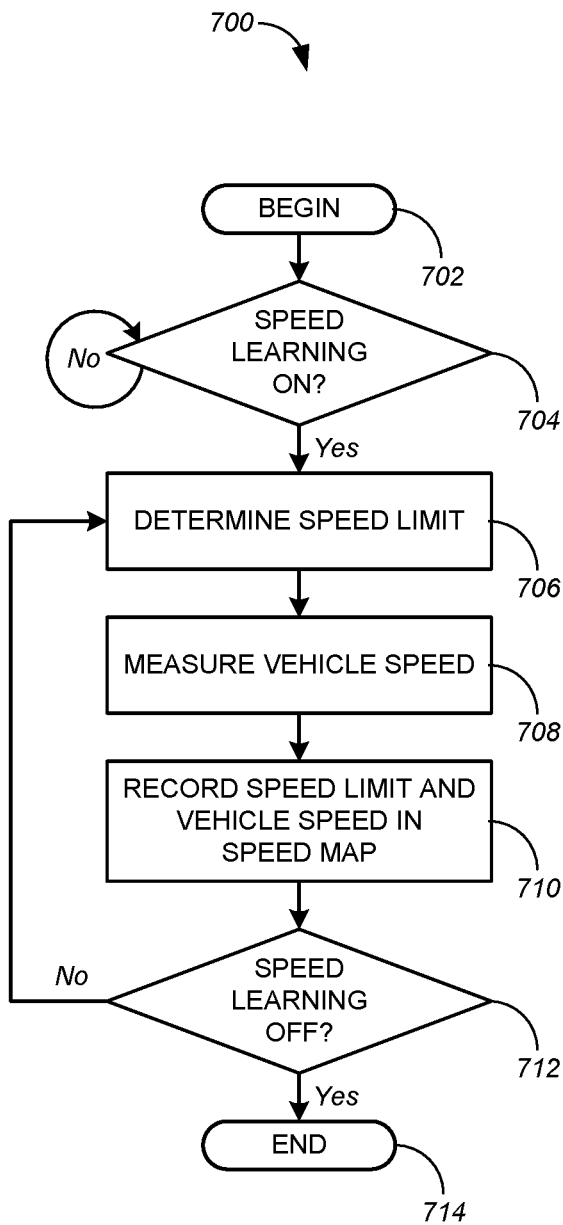
FIG. 7 is a flowchart illustrating a process for learning a speed map according to one embodiment.

In some embodiments, the speed maps described herein are populated without user intervention, such as through machine learning. In such embodiments, the speed control circuit 250 observes the speeds driven in various speed limit zones and populates the speed maps accordingly. FIG. 7 is a flowchart illustrating a process 700 for learning a speed map according to one embodiment. Referring to FIG. 7, the process 700 begins, at 702. The speed control circuit 250 first determines whether the speed control learning mode is on, at 704. This may include determining whether the speed control learning mode has been activated, for example manually by the driver using the speed control 205. The speed control circuit 250 continues this determination until the speed control learning mode is activated. In other embodiments, the speed control learning mode can always be on such that it is constantly adapting to the driver's behavior.

When the speed control learning mode is entered, the speed control circuit 250 determines a speed limit, at 706, for example as described above regarding speed control. After determining the speed limit, the speed control circuit 250 measures the speed of the vehicle, at 708. The speed control circuit 250 then records the speed limit and vehicle speed in the speed map, at 710. For a speed map using offsets, the speed control circuit 250 records the speed limit and the offset in the speed map. For a speed map using desired speeds, the speed control circuit 250 records the speed limit and the desired speed in the speed map.

The speed control circuit 250 occasionally determines whether the speed control learning mode has been deactivated, at 712. While the speed control learning mode is active, the speed control circuit 250 continues to determine the speed limit, measure the vehicle speed, and populate the speed map. When the speed control learning mode is deactivated, the process 700 ends, at 714.

In some embodiments, the speed control circuit 250 also considers adverse conditions when setting the vehicle speed. For example, sensors 116 may determine an adverse condition for the road being traveled by the vehicle. Adverse road conditions may be determined when the road is detected to be wet, icy, rough, winding, and the like. Other adverse conditions may be considered as well, for example including traffic density, time of day, and the presence of special zones such as school zones and construction zones.

In some embodiments, particular adverse-conditions offsets or desired speeds may be recorded in the speed map.

FIG. 8 shows a speed map 800 using adverse-conditions offsets. Speed map 800 includes a separate column including adverse-conditions offsets for different speed limits. In embodiments using such a speed map, when adverse conditions are determined, the speed control circuit 250 uses the adverse-conditions offsets instead of the normal offsets. In other embodiments the speed map may specify adverse conditions desired speeds rather than offsets. Various sensors 116 can be used to determine whether an adverse condition exists, and if so, the type of adverse condition. For example, road sensors 226 may determine the presence of potholes or other adverse road conditions that may warrant a lower or a negative offset. As another example, a combination of weather, image and road sensors may be used to determine whether ice, snow or other conditions have led to slippery road conditions.

For speed maps using offsets, the offsets for adverse conditions compared to the normal offsets are generally smaller, zero, or even negative numbers. Referring again to FIG. 8, for speed limits of 5 mph, 10 mph, 30 mph, and 70 mph, while the normal offsets are 5 mph, 5 mph, 10 mph, and 5 mph, respectively, the offsets for adverse conditions are 0 mph, 0 mph, −5 mph, and −10 mph, respectively. So for a speed limit of 70 mph, the normal desired speed would be 75 mph, where the desired speed under adverse conditions would be 60 mph.

In some embodiments, different offsets are used for different adverse conditions. So for a particular speed limit, the offset for a school zone might be 0 mph, while the offset for an icy road might be −15 mph. As with normal offset values, adverse-conditions offsets can be manually entered by a driver or learned based on actual driver behavior. The speed settings for adverse-conditions can be provided as adverse-conditions offsets (as shown in FIG. 8), or as actual adverse-conditions speeds.

In some embodiments, adverse-conditions speed settings can be factory set or factory-established not-to-exceed limits, and can be imposed such that the offsets used during detected adverse-conditions cannot exceed a predetermined amount. In further embodiments, an adverse-conditions setting can be employed such that the speed offset feature is canceled upon the detection of certain adverse-conditions.

As indicated above, in various embodiments the offset amounts or desired speeds can be determined for individual drivers of the vehicle. For example, in accordance with the examples provided above, various drivers of a vehicle may manually enter their desired offset amounts or the vehicle can employ machine learning or other techniques to populate a speed map based on observed driver behavior. The vehicle can use various driver identification techniques to determine an identity of the driver of the vehicle and to apply the speed map that is particular to the identified driver. For example, the vehicle can employ various biometric sensors to determine the identity of the driver. These can include, for example, image sensors for facial recognition, voice recognition, fingerprint sensors, and so on. As another example, a set of offset amounts can be correlated to a smart key used to operate the vehicle. As yet another example, a driver may be asked to enter his or her identification into the vehicle head units such as via keypad entry or speech recognition.

Figure 9:
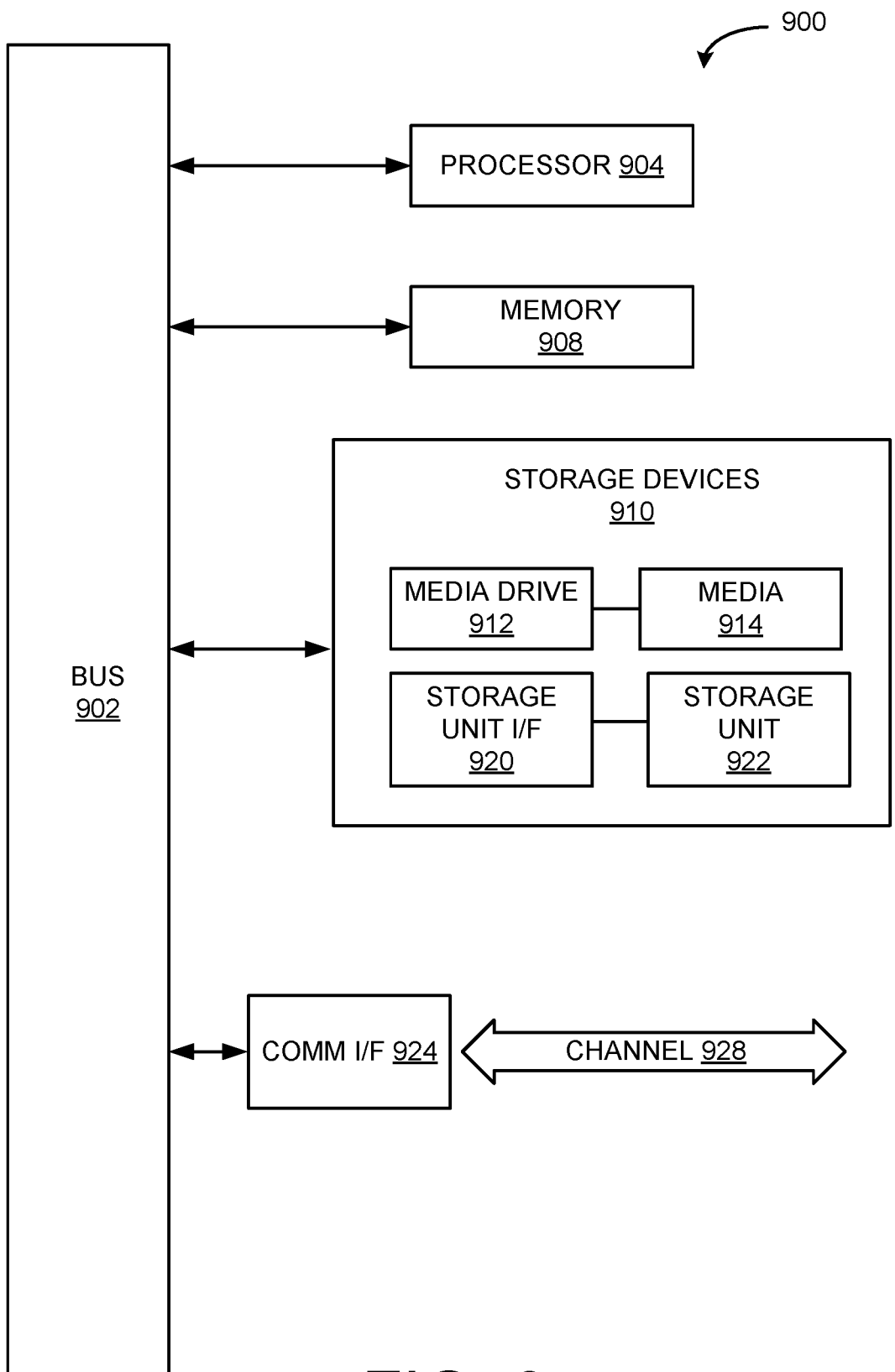
FIG. 9 shows an example computing component according to various embodiments.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up hybrid vehicle 102 and its component parts, for example such as the computing component. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for automatically controlling the speed of a vehicle, the method comprising:
   determining a speed limit;
   determining an offset value that relies on at least one of driver-defined offset values and learned driver behaviors when operating the vehicle by referencing a speed map that is generated with the use of at least one of geographic speed limits and learned driver behaviors, the speed map comprising a plurality of entries, each entry associating one of the offset values with a respective speed limit; and automatically setting the speed of the vehicle according to the speed limit and the determined offset value.

2. The method of claim 1, further comprising:
modifying the speed map according to behavior of a driver of the vehicle.

3. The method of claim 2, wherein:
modifying the speed map occurs without human intervention.

4. The method of claim 2, wherein:
modifying the speed map occurs responsive to human intervention.

5. The method of claim 2, wherein modifying the speed map comprises:
measuring a speed of the vehicle; and
recording the speed limit and an offset value in the speed map, the offset value representing a difference between the speed of the vehicle and the speed limit.

6. The method of claim 1, further comprising:
determining an adverse condition for the road being traveled by the vehicle; and
adjusting the speed of the vehicle based on the adverse condition.

7. The method of claim 1, wherein determining an offset value comprises:
when the speed map does not contain an entry for the determined speed limit, interpolating using a plurality of the entries in the speed map.

8. A method for automatically controlling the speed of a vehicle, the method comprising:
determining a speed limit;
determining a desired speed based on at least one of driver-defined desired speeds and learned driver behaviors when operating the vehicle by referencing a speed map, the speed map comprising a plurality of entries, each entry associating one of the desired speeds with a respective speed limit; and
automatically setting the speed of the vehicle according to the speed limit, desired speed, and an offset value, wherein the offset value is determined by driver-defined offset values and learned driver behaviors.

9. The method of claim 8, further comprising:
modifying the speed map according to behavior of a driver of the vehicle.

10. The method of claim 9, wherein:
modifying the speed map occurs without human intervention.

11. The method of claim 9, wherein:
modifying the speed map occurs responsive to human intervention.

12. The method of claim 9, wherein modifying the speed map comprises:
measuring a speed of the vehicle; and
recording the speed of the vehicle and the speed limit in the speed map.

13. The method of claim 8, further comprising:
determining an adverse condition for the road being traveled by the vehicle; and
adjusting the speed of the vehicle based on the adverse condition.

14. The method of claim 9, wherein determining a desired speed comprises:
when the speed map does not contain an entry for the determined speed limit, interpolating using a plurality of the entries in the speed map.

15. A non-transitory machine-readable storage medium encoded with instructions executable by a hardware processor of a computing component of a vehicle, the machine-readable storage medium comprising instructions to cause the hardware processor to:
determine a speed limit;
determine an offset value that relies on at least one of driver-defined offset values and learned driver behaviors when operating the vehicle by referencing a speed map that is generated with the use of at least one of geographic speed limits and learned driver behaviors, the speed map comprising a plurality of entries, each entry associating one of the offset values with a respective speed limit; and
automatically set the speed of the vehicle according to the speed limit and the determined offset value.

16. The non-transitory machine-readable storage medium of claim 15, further comprising instructions to cause the hardware processor to:
modify the speed map according to behavior of a driver of the vehicle.

17. The non-transitory machine-readable storage medium of claim 16, further comprising instructions to cause the hardware processor to:
modify the speed map without human intervention.

18. The non-transitory machine-readable storage medium of claim 16, further comprising instructions to cause the hardware processor to:
modify the speed map responsive to human intervention.

19. The non-transitory machine-readable storage medium of claim 16, further comprising instructions to cause the hardware processor to:
measure a speed of the vehicle; and
record the speed limit and an offset value in the speed map, the offset value representing a difference between the speed of the vehicle and the speed limit.

20. The non-transitory machine-readable storage medium of claim 15, further comprising instructions to cause the hardware processor to:
determine an adverse condition for the road being traveled by the vehicle; and
adjust the speed of the vehicle based on the adverse condition.

* * * * *